US007570225B2

(12) United States Patent
Kai et al.

(10) Patent No.: US 7,570,225 B2
(45) Date of Patent: Aug. 4, 2009

(54) ANTENNA AND NON-CONTACT TAG

(75) Inventors: Manabu Kai, Kawasaki (JP); Toru Maniwa, Kawasaki (JP); Takashi Yamagajo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/790,580

(22) Filed: Apr. 26, 2007

(65) Prior Publication Data

US 2007/0200711 A1 Aug. 30, 2007

Related U.S. Application Data

(63) Continuation of application No. PCT/JP2004/018610, filed on Dec. 14, 2004.

(51) Int. Cl.
*H01Q 1/36* (2006.01)

(52) U.S. Cl. ...................... 343/895; 343/741; 343/767; 343/770

(58) Field of Classification Search ................ 343/726, 343/741, 767, 770, 793, 895, 700 MS
See application file for complete search history.

(56) References Cited

U.S. PATENT DOCUMENTS

| | | | | |
|---|---|---|---|---|
| 6,181,287 | B1 * | 1/2001 | Beigel | 343/741 |
| 6,346,916 | B1 | 2/2002 | Odachi et al. | |
| 6,891,466 | B2 * | 5/2005 | Turner et al. | 340/10.1 |
| 7,215,295 | B2 * | 5/2007 | Egbert | 343/795 |
| 7,256,739 | B2 * | 8/2007 | Usami | 343/700 MS |
| 7,276,388 | B2 * | 10/2007 | Arneson et al. | 438/17 |
| 7,336,243 | B2 * | 2/2008 | Jo et al. | 343/895 |
| 7,342,498 | B2 * | 3/2008 | Baba et al. | 340/572.5 |
| 2002/0005433 | A1 | 1/2002 | Nochi et al. | |
| 2002/0018021 | A1 | 2/2002 | Koyanagi et al. | |
| 2003/0078012 | A1 | 4/2003 | Ito et al. | |
| 2005/0253685 | A1 | 11/2005 | Catteau et al. | |

FOREIGN PATENT DOCUMENTS

| | | | |
|---|---|---|---|
| EP | 1032076 | A2 | 8/2000 |
| EP | 1315233 | A1 | 5/2003 |
| JP | 63-059105 | A | 3/1988 |

(Continued)

OTHER PUBLICATIONS

"Antenna Technology Handbook" (Ohmsha Ltd.), the Institute of Electronics, Information and Communication Engineers, *IEICE*, Oct. 1980, pp. 112-115.

(Continued)

*Primary Examiner*—Douglas W. Owens
*Assistant Examiner*—Chuc Tran
(74) *Attorney, Agent, or Firm*—Fujitsu Patent Center

(57) ABSTRACT

An RFID antenna that can be disposed in a space-saving manner. The RFID antenna comprises an outermost peripheral conductive line that is bent in a manner extending along sides of a generally rectangular shape having a predetermined size, and a power-feeding conductive line that is disposed close to an inner periphery of the outermost peripheral conductive line in a manner extending parallel therewith, and is electrically connected to the outermost peripheral conductive line at ends thereof, the power-feeding conductive line including a portion thereof formed with a feeder part. Therefore, the antenna fits into a rectangle having a predetermined size, such as a card size.

12 Claims, 15 Drawing Sheets

10
11a
w1
13
d1
14
12
11

FOREIGN PATENT DOCUMENTS

| | | | |
|---|---|---|---|
| JP | 63-059105 | A | 3/1988 |
| JP | 10-041726 | A | 2/1998 |
| JP | 11-203435 | A | 7/1999 |
| JP | 2000-222540 | A | 8/2000 |
| JP | 2000-252737 | A | 9/2000 |
| JP | 2002-009534 | A | 1/2002 |
| JP | 2002-043826 | A | 2/2002 |
| JP | 2004-048223 | A | 2/2004 |
| JP | 2004-186827 | A | 7/2004 |
| JP | 2004-228917 | A | 8/2004 |
| JP | 2004-295297 | A | 10/2004 |
| WO | 98/40930 | | 9/1998 |
| WO | 02/19465 | A1 | 3/2002 |
| WO | 03/044892 | | 5/2003 |
| WO | 03/096478 | | 11/2003 |
| WO | WO-03/107267 | | 12/2003 |

OTHER PUBLICATIONS

J.A. Flint, J.C. Vardaxoglou; Exploitation of Nonradiating Modes in Asymmetric Coplanar Strip Folded Dipoles; IEE Proc. *Microw* Aug. 2004; pp. 307-310.

A. Krischke; *Rothammels's Antennenbuch*; 2001; XP002455790, section 6.2.5.

European Supplementary search report; Application No. 04806971.0-1248; Reference No. 121182a/jme; dated Oct. 31, 2007; 3-pages.

"Japanese Office Action", English Translation, mailed Mar. 30, 2009, of corresponding JP Patent Application No. 2006-548596.

* cited by examiner

ANTENNA AND NON-CONTACT TAG

This application is a continuing application, filed under 35 U.S.C. §111(a), of International Application PCT/JP2004/018610, filed Dec. 14, 2004.

BACKGROUND OF THE INVENTION

1. Field of the Invention

The present invention relates to an antenna and a non-contact tag, and more particularly to an RFID (Radio Frequency Identification) antenna and an RFID non-contact tag, for performing transmission and reception with an RFID reader/writer.

2. Description of the Related Art

An RFID system in which non-contact tags (hereinafter referred to as "the RFID tags") having identification information embedded therein are attached to respective articles or persons, thereby enabling transmission/reception of information between the persons or the articles and RFID reader/writers (hereinafter simply referred to as "the reader/writers") using a radio signal, is expected to be applied to various fields, such as management of factory production, management of physical distribution, and management of room entrance/exit, and is coming into practical use.

The method of communication therefore is classified into an electromagnetic induction method and a radio-frequency method. The electromagnetic induction method mainly uses electromagnetic waves of 135 kHz or 13.56 MHz, and transmits/receives information by induced voltage caused between the antenna of an RFID tag and the antenna coil of an RFID reader/writer. The communication distance is limited to the maximum of approximately 1 m.

On the other hand, the radio-frequency method uses radio waves in a UHF band (860 to 960 MHz) or radio waves of 2.45 GHz, and performs communication between the antenna of an RFID tag and the antenna of an RFID reader/writer. However, since the radio waves of 2.45 GHz are short in wavelength, communication trouble can occur due to obstruction. Therefore, recently, attention is being given to RFID systems using radio waves in the UHF band.

In the following, a description will be given of a RFID system using a radio signal in the UHF band.

In communication between an RFID tag and a reader/writer, first, the reader/writer sends a signal of approximately 1 W to the RFID tag, using a radio signal in the UHF band, and the RFID tag receives the signal and sends a response signal back to the reader/writer again. Through the signal exchange, the reader/writer can read information stored in the RFID tag. The communication distance depends on the gain of a tag antenna, the operating voltage of an IC (Integrated Circuit) chip, and the ambient environment, but is within approximately 3 m.

The RFID tag comprises the antenna and the IC chip connected to the antenna. The IC chip has a size of several mm or less, but the antenna basically requires a length of a half wavelength $\lambda/2$. For this reason, when the UHF band is utilized, the antenna requires a size of approximately 150 mm, and the performance of the RFID tag largely depends on the size of its antenna.

FIG. 14 shows an equivalent circuit of the RFID tag.

The IC chip can be equivalently expressed by parallel connection of a resistance R1 and a capacitance C1 (e.g. 1 pF). As the resistance R1 of the IC chip, a large resistance of approximately 1000 Ω is used so as to maintain a driving voltage of several volts with respect to a predetermined electric power. On the other hand, the antenna can be equivalently expressed by a parallel connection of a radiation resistance R2 (e.g. 1000 Ω) and an inductance L1 (e.g. 28 nH). By connecting the IC chip and the antenna in parallel, and performing impedance matching between the two, resonance occurs between the capacitance C1 and the inductance L1 and the imaginary number component is reduced to substantially zero to achieve the impedance matching, whereby electric power received by the antenna is sufficiently supplied to the IC chip.

By the way, the radiation resistance of a single dipole antenna is approximately 72 Ω, and hence it is required to increase the radiation resistance so as to achieve impedance matching with an IC chip of the above-mentioned type.

Conventionally, there has been proposed a folded antenna described below.

FIG. 15 is a view of the arrangement of the folded antenna.

The illustrated conventional folded antenna 80 comprises two dipole antennas 81*a* and 81*b* each having a length of approximately 150 mm and arranged close to each other in parallel, with a spacing of e.g. 10 mm therebetween. The dipole antenna 81*a* and the dipole antenna 81*b* are connected to each other at opposite ends thereof, and electric power is fed via a feeder part 82 formed in the center of the dipole antenna 81*a*. With this arrangement, the radiation resistance R2 appearing in FIG. 14 can be made more than four times larger than the radiation resistance (72 Ω) of a single dipole antenna. Further, by changing the ratio of the line width of the dipole antenna 81*b* to that of the dipole antenna 81*a* as shown in FIG. 15, it is possible to adjust the radiation resistance such that it is increased to approximately 1000 Ω (see e.g. "Antenna Technology Handbook" (Ohmsha Ltd.), the Institute of Electronics, Information and Communication Engineers (IEICE), October, 1980, pp. 112-115).

However, although it is desirable for practical use that an RFID tag has a size not larger than a card size (86 mm×54 mm), for example, the conventional folded antenna requires a length of a longitudinal side thereof of approximately 150 mm for receiving a radio signal in the UHF band. The length is too large for practical use.

SUMMARY OF THE INVENTION

The present invention has been made in view of the problem, and an object thereof is to provide an RFID antenna that can be disposed in a space-saving manner.

Another object of the present invention is to provide an RFID tag which can be reduced in size.

To accomplish the above object, the present invention provides an antenna for RFID. This antenna comprises an outermost peripheral conductive line that is bent in a manner extending along sides of a generally rectangular shape having a predetermined size, and a power-feeding conductive line that is disposed close to an inner periphery of said outermost peripheral conductive line in a manner extending parallel therewith, and is electrically connected to said outermost peripheral conductive line at ends thereof, said power-feeding conductive line including a portion formed with a feeder part.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Hereinafter, embodiments of the present invention will be described in detail with reference to the drawings.

Figure 1:
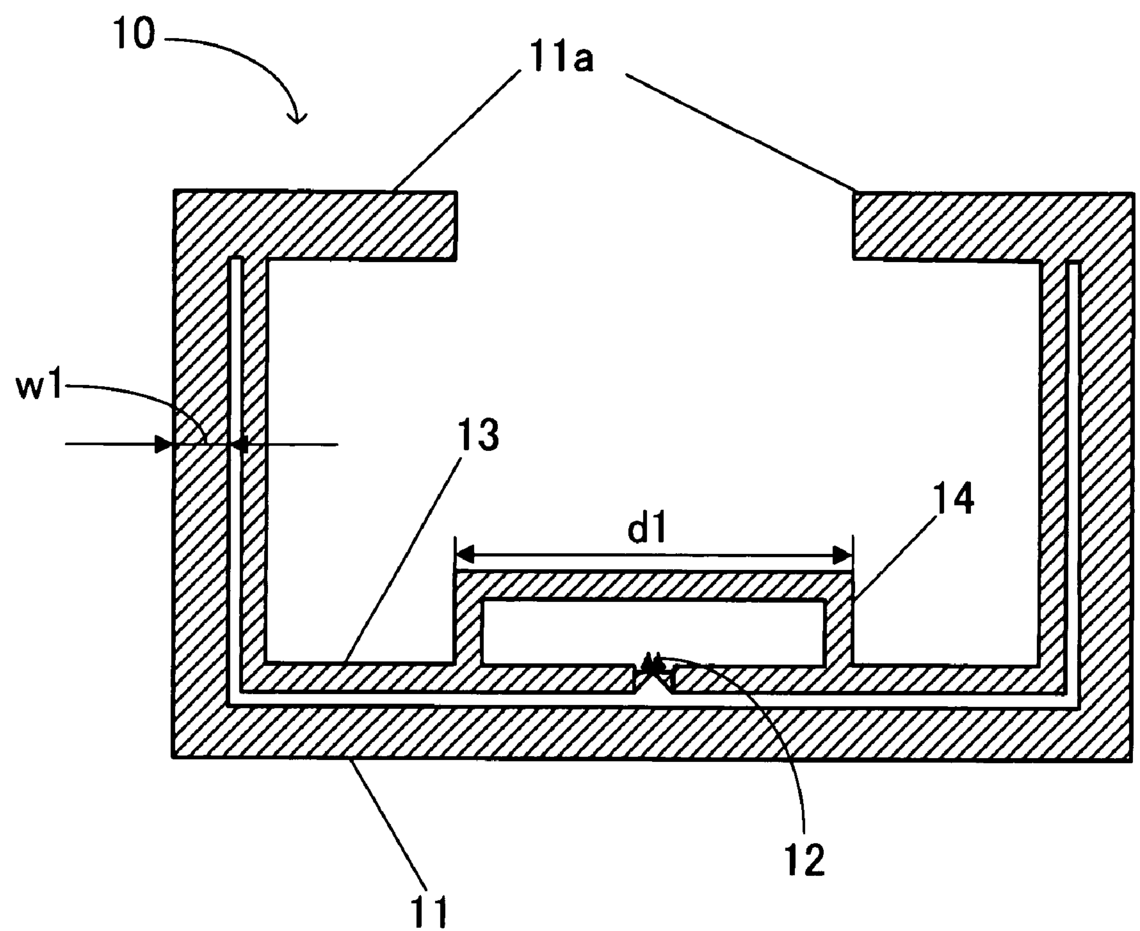
FIG. 1 is a view of the arrangement of an RFID antenna according to a first embodiment.

FIG. 1 is a view of the arrangement of an RFID antenna according to a first embodiment.

In the following, a description will be given of a case where radio waves in the UHF band and particularly of 953 MHz are used for communication.

Figure 15:
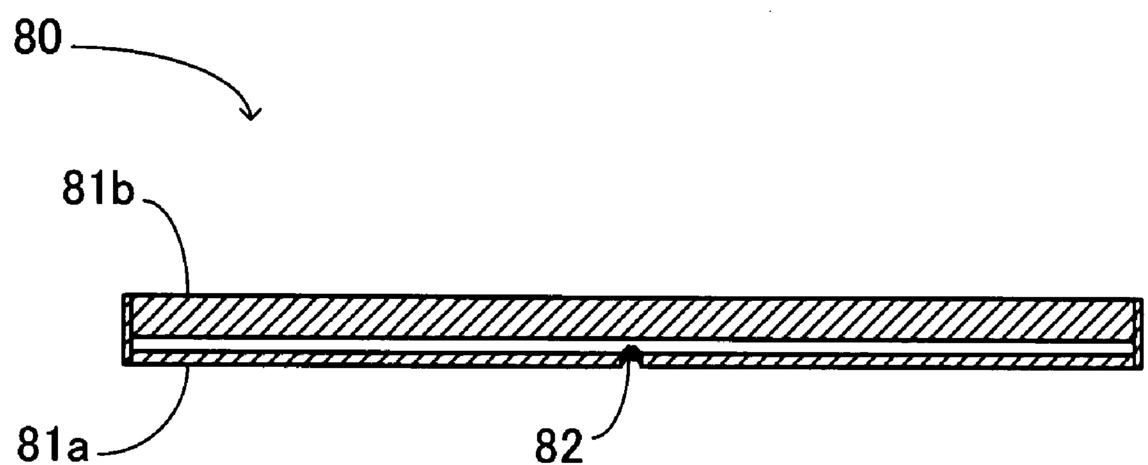
FIG. 15 is a view of the arrangement of a folded antenna.

The antenna 10 according to the first embodiment is formed by bending the folded antenna, shown in FIG. 15, into a rectangular shape, and comprises an outmost peripheral conductive line (hereinafter simply referred to as the outermost peripheral line) 11 bent in a manner extending along the sides of a rectangle having a size of approximately 72 mm×42 mm, for example, and a power-feeding conductive line (hereinafter simply referred to as the feeder line) 13 disposed close to the inner periphery of the outermost peripheral line 11 in a manner extending parallel therewith. The feeder line 13 is electrically connected to the outermost peripheral line 11 at ends thereof, and includes a portion formed with a feeder part 12. In the antenna 10 according to the first embodiment, the outermost peripheral line 11 and the feeder line 13 are formed in a manner extending bilaterally symmetrically with respect to the feeder part 12.

Further, the antenna 10 has an impedance-adjusting inductor 14 for performing impedance matching with an IC chip (not shown) connected to the feeder part 12. The inductor 14 is disposed in an area inside the rectangle. In the first embodiment, the inductor 14 has two bent portions, and is connected to one side of a rectangular shape into which the feeder line 13 is bent.

An antenna for receiving an electromagnetic wave of a predetermined frequency basically needs to have a length of a half wavelength $\lambda/2$. Therefore, in order to receive an electromagnetic wave of 953 MHz, an antenna needs to have a length of approximately 150 mm. In the case of the antenna 10, the outermost peripheral line 11 is formed to have a length large enough to receive the electromagnetic wave of 953 MHz. However, when the line is bent into a rectangular shape as shown in FIG. 1, it is actually required to have a length larger than 150 mm so as to cause resonance. For this reason, lines 11*a* for adjusting the length are added to the outermost peripheral line 11. It should be noted that the lines 11*a* may be formed by extending the outermost peripheral line 11 and the feeder line 13 in parallel similarly to the other part of the antenna 10 (in this case, however, the feeder line 13 is required to be connected to the outermost peripheral line 11 at ends thereof).

The antenna 10 is formed e.g. of copper, silver, or aluminum.

By configuring the antenna 10 as described above, it is possible to reduce the size of the folded antenna capable of obtaining a high radiation resistance e.g. to a card size (86 mm×54 mm).

It is preferred that the bending angle of the rectangle is set to 90°, because this makes it possible to increase the antenna size within a predetermined area. However, the bending angle may be set to an angle of e.g. 80° or 45°, which is smaller than 90°.

Figure 2:
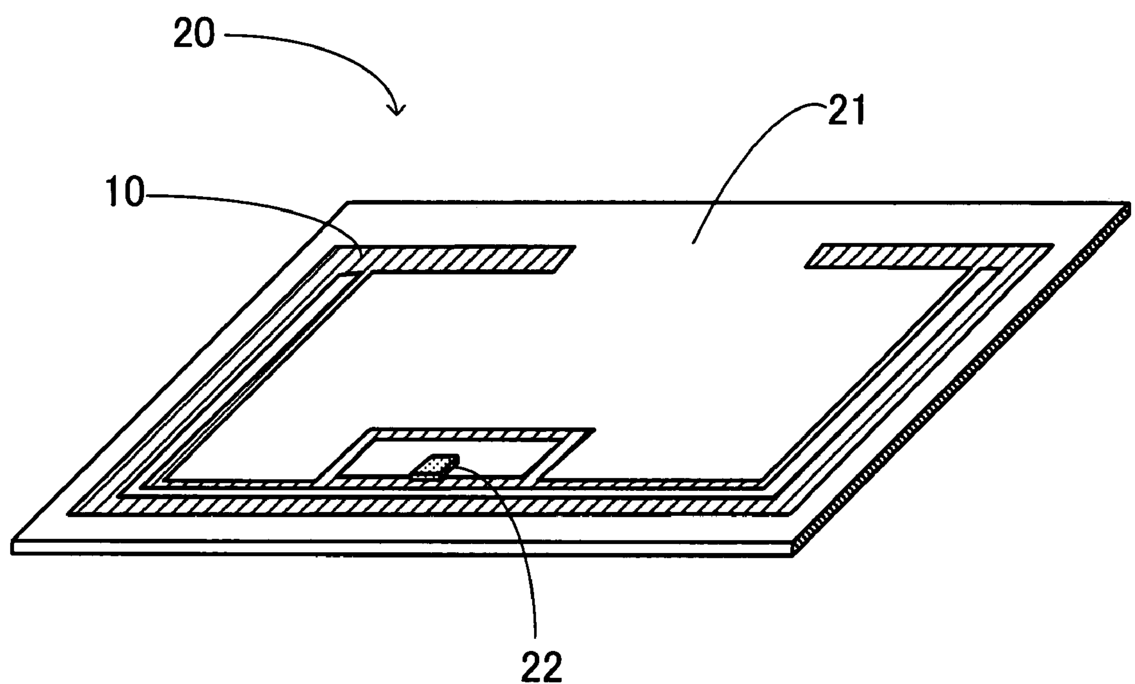
FIG. 2 is a view of the arrangement of an RFID tag to which is applied the antenna according to the first embodiment.

FIG. 2 is a view of an RFID tag to which is applied the antenna according to the first embodiment.

The RFID tag 20 is configured such that the antenna 10 shown in FIG. 1 is formed on a sheet 21 and an IC chip 22 is connected to the feeder part 12.

The antenna 10 has a size of approximately 72 mm×42 mm and a thickness of approximately 0.02 mm, for example. The sheet 21 is formed e.g. of paper or PET (polyethylene terephthalate) film. The sheet 21 has a size of approximately 86 mm×54 mm and a thickness of approximately 0.1 mm, for example.

The IC chip 22 has a size of approximately 1 mm×1 mm and a thickness of approximately 0.2 mm, for example.

Impedance matching between the antenna 10 and the IC chip 22 can be achieved by adjusting the antenna 10 as described below.

Figure 3:
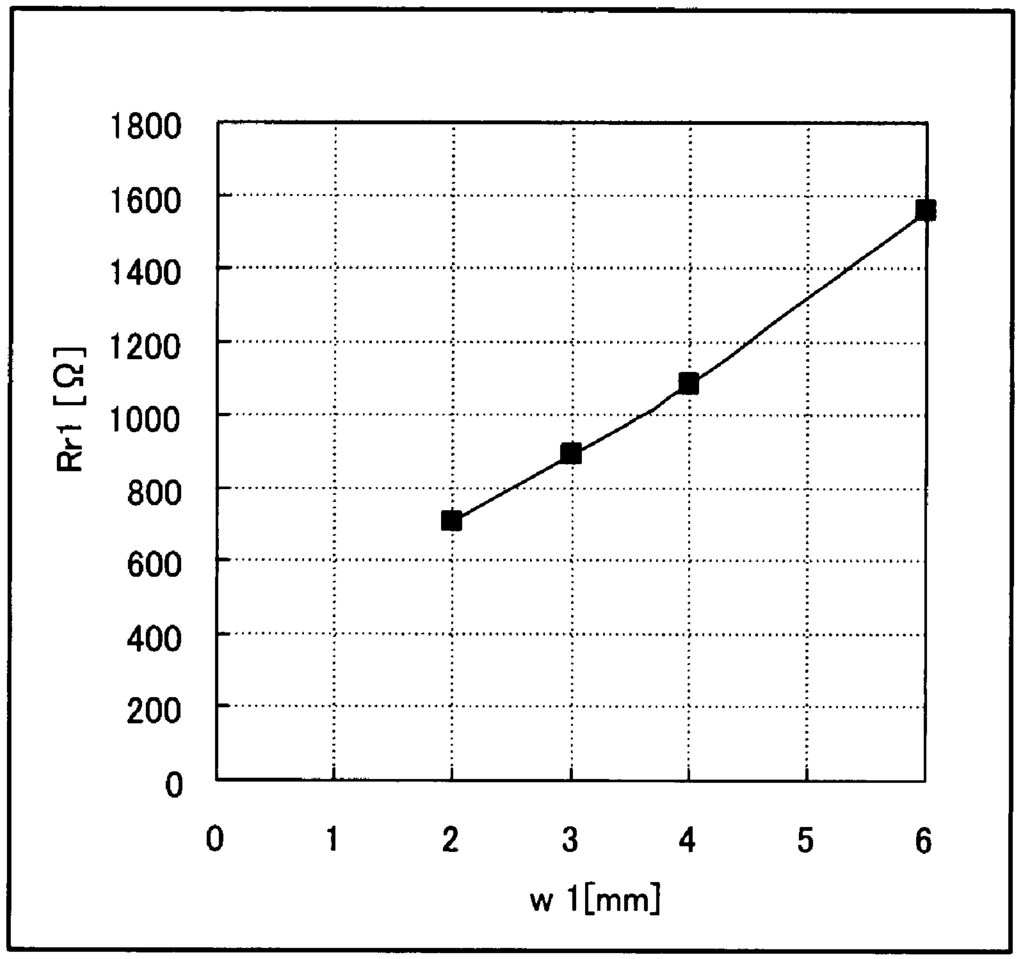
FIG. 3 is a diagram illustrating a result of an electromagnetic field simulation, which shows the relationship between the line width of an outermost peripheral line and radiation resistance.

FIG. 3 is a diagram illustrating a result of an electromagnetic field simulation, which shows the relationship between the line width of an outermost peripheral line and radiation resistance.

It should be noted that in the present example, the line width of the feeder line 13 is fixedly set to 2 mm. Further, the space between the outermost peripheral line 11 and the feeder line 13 is set to 1 mm. As shown in FIG. 3, by changing the line width w1 of the outermost peripheral line 11 within a range of 2 to 6 mm, for example, it is possible to adjust the radiation resistance Rr1 within a range of approximately 700 to 1600 Ω. In short, it is understood that the radiation resistance Rr1 increases as the line width w1 of the outermost peripheral line 11 is increased with respect to the line width of the feeder line 13.

Figure 4:
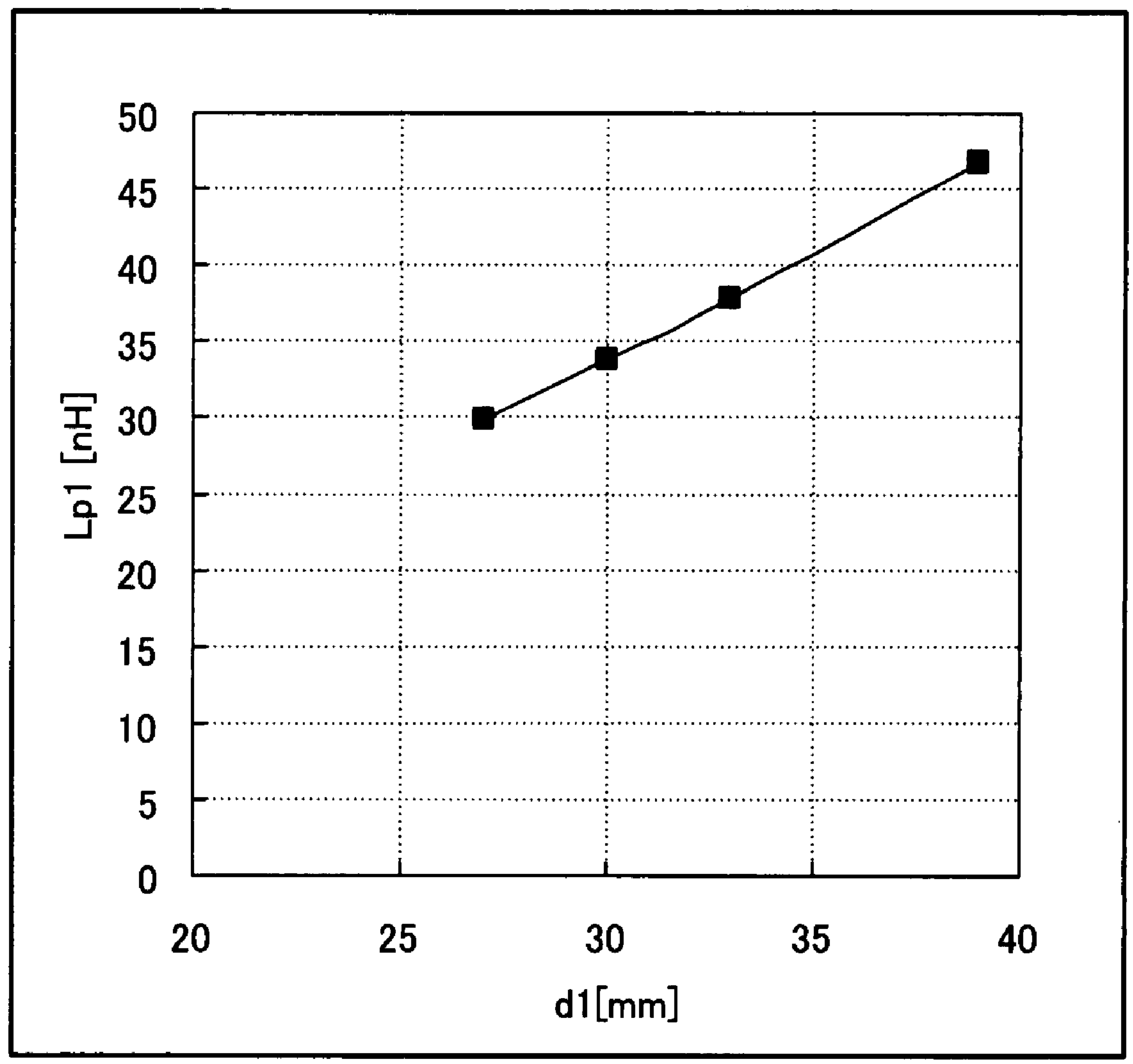
FIG. 4 is a diagram illustrating a result of an electromagnetic field simulation, which shows the relationship between the length of an inductor and the value of inductance.

FIG. 4 is a diagram illustrating a result of an electromagnetic field simulation, which shows the relationship between the length of an inductor and the value of inductance.

By changing the length d1 of the inductor 14 appearing in FIG. 1 within a range of 27 to 39 mm, for example, it is possible to adjust the inductance value Lp1 within a range of approximately 30 to 47 nH.

Figure 5:
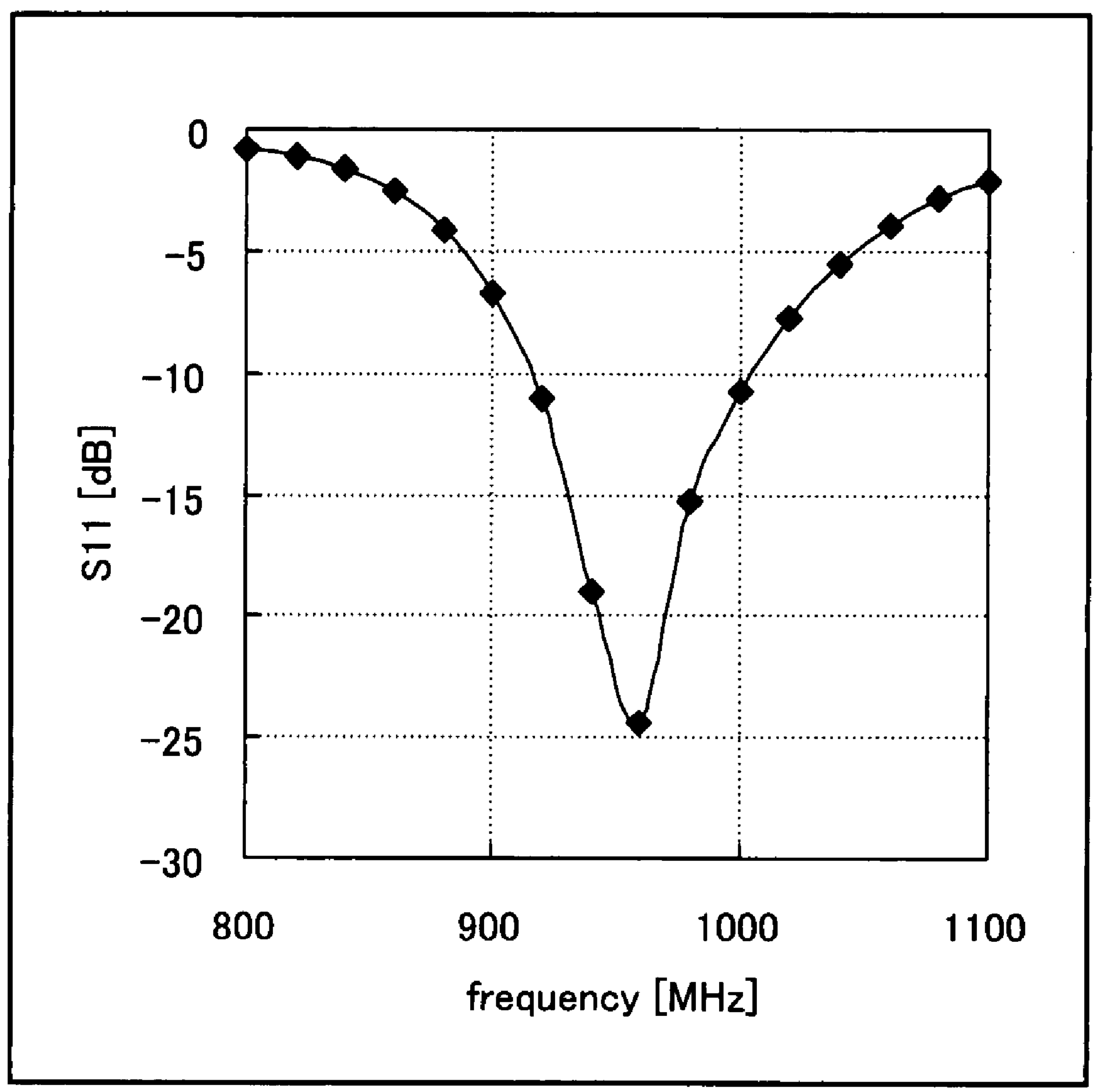
FIG. 5 is a diagram showing calculated values of a reflection coefficient between an antenna and an IC chip. The abscissa represents frequency.
Figure 14:
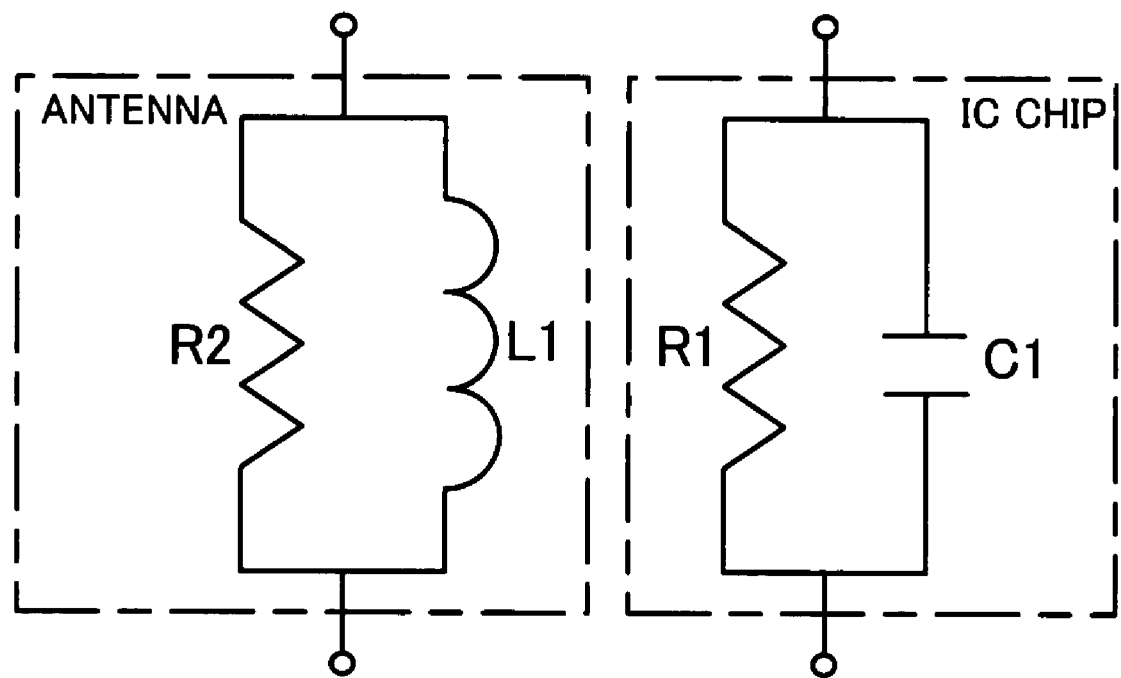
FIG. 14 is a view of an equivalent circuit of an RFID tag.

For example, assuming that the resistance is 1000 Ω and the capacitance is 0.9 pF in the equivalent circuit of the IC chip 22 (see FIG. 14), it is required to set the radiation resistance Rr1 of the antenna 10 to 1000 Ω and the inductance value Lp1 to 31 nH so as to achieve impedance matching between the IC chip 22 and the antenna 10. Therefore, as can be understood from FIGS. 3 and 4, by setting the line width w1 of the outermost peripheral line 11 to approximately 3.6 mm, and the length d1 of the inductor 14 to approximately 27.5 mm, the impedance matching between the IC chip 22 and the antenna 10 can be achieved, whereby power received by the antenna 10 is sufficiently supplied to the IC chip 22. The reflection coefficient between the antenna and the IC chip at this time is as follows:

FIG. 5 is a diagram showing calculated values of the reflection coefficient between the antenna and the IC chip. The abscissa represents frequency.

When frequency f=953 MHz holds, the reflection coefficient S11 is below −20 dB, which shows that the impedance matching is sufficiently achieved.

Figure 6:
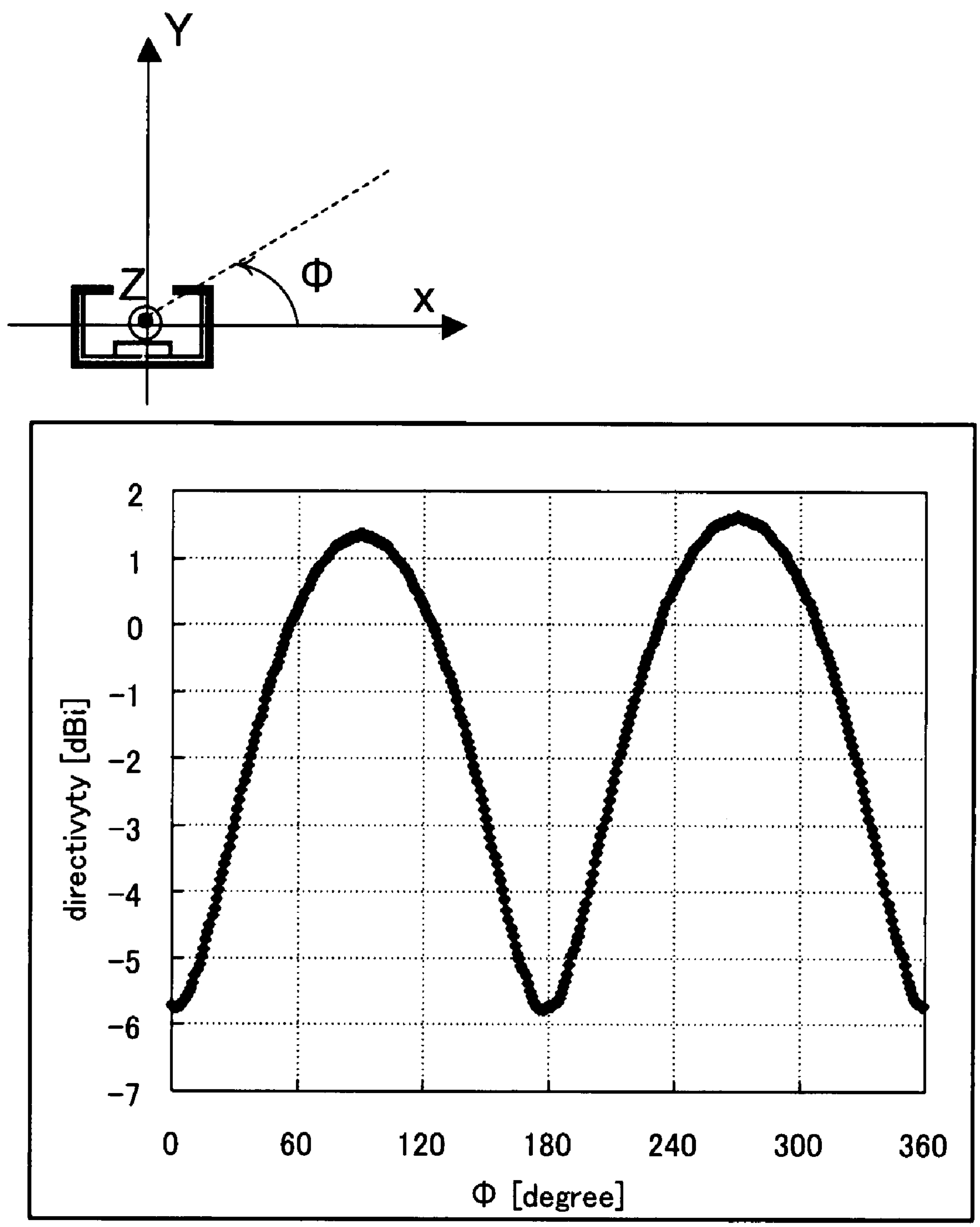
FIG. 6 is a diagram showing a radiation pattern of the antenna according to the first embodiment.

FIG. 6 is a diagram showing the radiation pattern of the antenna according to the first embodiment.

The abscissa represents an angle ϕ on an X-Y plane defined by an X axis representing a direction along a long side of the rectangle of the antenna 10 and a Y axis representing a direction along a short size of the same, as measured from the X axis which is set to 0 degrees, and the ordinate represents directivity (specifically, the absolute gain [dBi] of the antenna 10).

The directivity of the antenna 10 according to the first embodiment is maximized when the angle ϕ is 90° or 270°.

In the following, a description will be given of an antenna according to a second embodiment.

Figure 7:
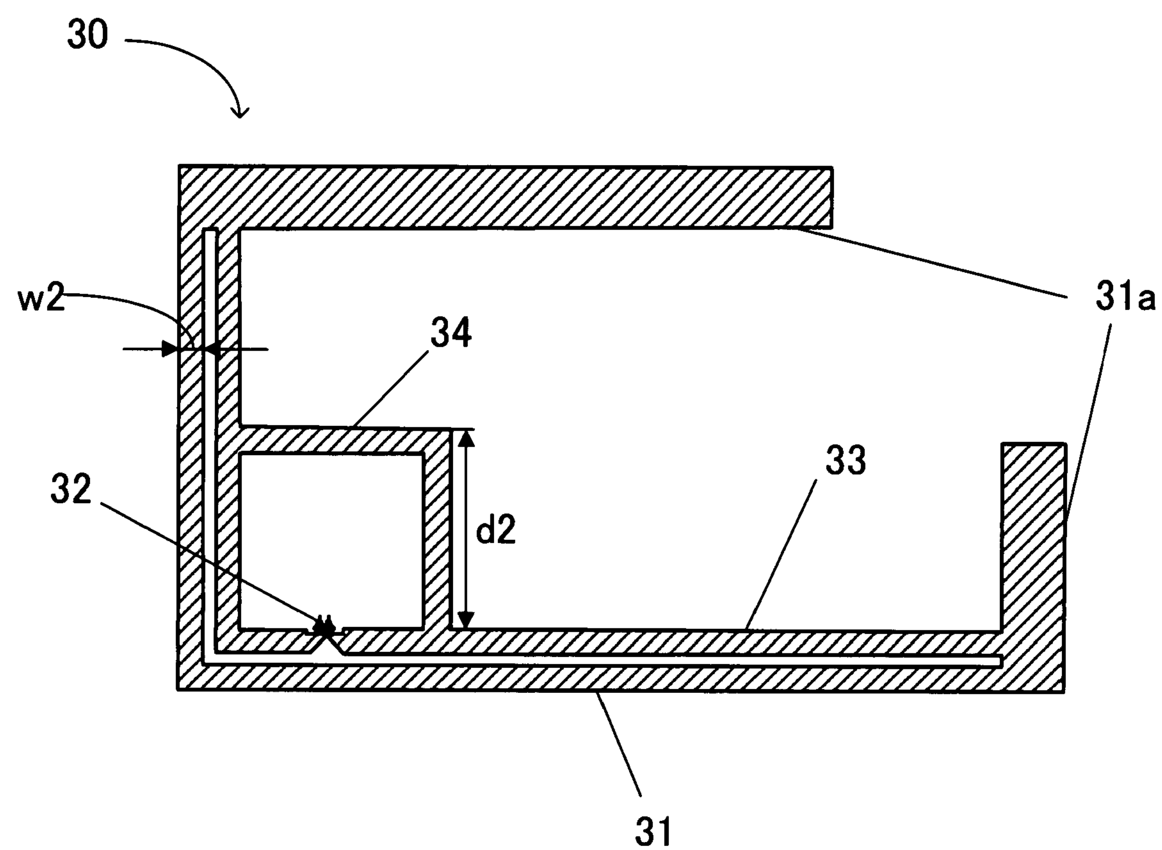
FIG. 7 is a view of the arrangement of an RFID antenna according to a second embodiment.

FIG. 7 is a view of the arrangement of the RFID antenna according to the second embodiment.

Similarly to the antenna according to the first embodiment, the antenna 30 according to the second embodiment comprises an outermost peripheral line 31 that is bent in a manner extending along the sides of a rectangle having a size of approximately 72 mm×42 mm, for example, and a feeder line 33 that is disposed close to the inner periphery of the outermost peripheral line 31 in a manner extending parallel therewith, and is electrically connected to the outermost peripheral line 31 at ends thereof, the feeder line 33 including a portion formed with a feeder part 32. However, the antenna 30 according to the second embodiment is different from the antenna 10 according to the first embodiment in that the outermost peripheral line 31 and the feeder line 33 are formed in a manner extending bilaterally asymmetrically with respect to the feeder part 32.

Further, the antenna 30 has an impedance-adjusting inductor 34 for performing impedance matching with an IC chip (not shown) connected to the feeder part 32. The inductor 34 is disposed in an area inside the rectangle. In the antenna 30 according to the second embodiment, the inductor 34 has a single bent portion, and is connected to two of the sides of a rectangular shape into which the feeder line 33 is bent. Compared with the inductor 14 of the antenna 10 according to the first embodiment, the inductor 34 has only one bent portion, so as to reduce loss due to current concentration.

In the antenna 30 according to the second embodiment as well, lines 31*a* for adjusting length are added to the outermost peripheral line 31. Although the lines 31*a* are formed as solid traces each having a width obtained e.g. by adding together the line widths of the outermost peripheral line 31 and the feeder line 33 and the width of a space between the lines 31 and 33, so as to increase the antenna area, the lines 31*a* may be formed by extending the outermost peripheral line 31 and the feeder line 33 in parallel similarly to the other part of the antenna 30 (in this case, however, the feeder line 33 is required to be connected to the outermost peripheral line 31 at ends thereof).

In a case where the antenna 30 according to the second embodiment is installed in place of the antenna 10 installed in the RFID tag 20 shown in FIG. 2, by adjusting the ratio between the line width w2 of the outermost peripheral line 31 and the line width of the feeder line 33, and adjusting the length d2 of the inductor 34, it is possible to achieve impedance matching with the IC chip 22.

Figure 8:
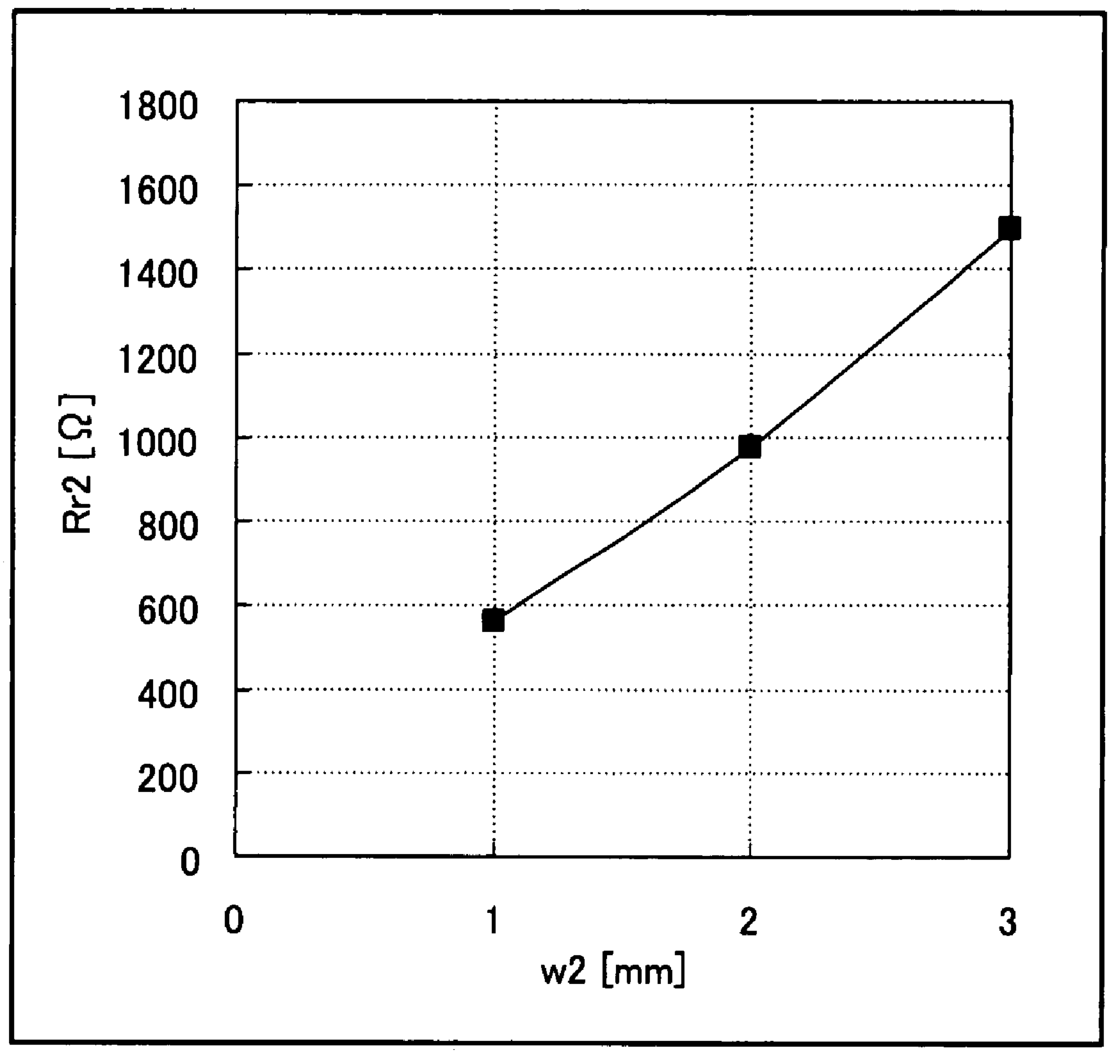
FIG. 8 is a diagram illustrating a result of an electromagnetic field simulation, which shows the relationship between the line width of an outermost peripheral line and radiation resistance.

FIG. 8 is a diagram illustrating a result of an electromagnetic field simulation, which shows the relationship between the line width of an outermost peripheral line and radiation resistance.

It should be noted that in the present example, the line width of the feeder line 33 is fixedly set to 2 mm. Further, the space between the outermost peripheral line 31 and the feeder line 33 is set to 1 mm. As shown in FIG. 8, by changing the line width w2 of the outermost peripheral line 31 within a range of 1 to 3 mm, for example, it is possible to adjust the radiation resistance Rr2 within a range of approximately 550 to 1500 Ω.

Figure 9:
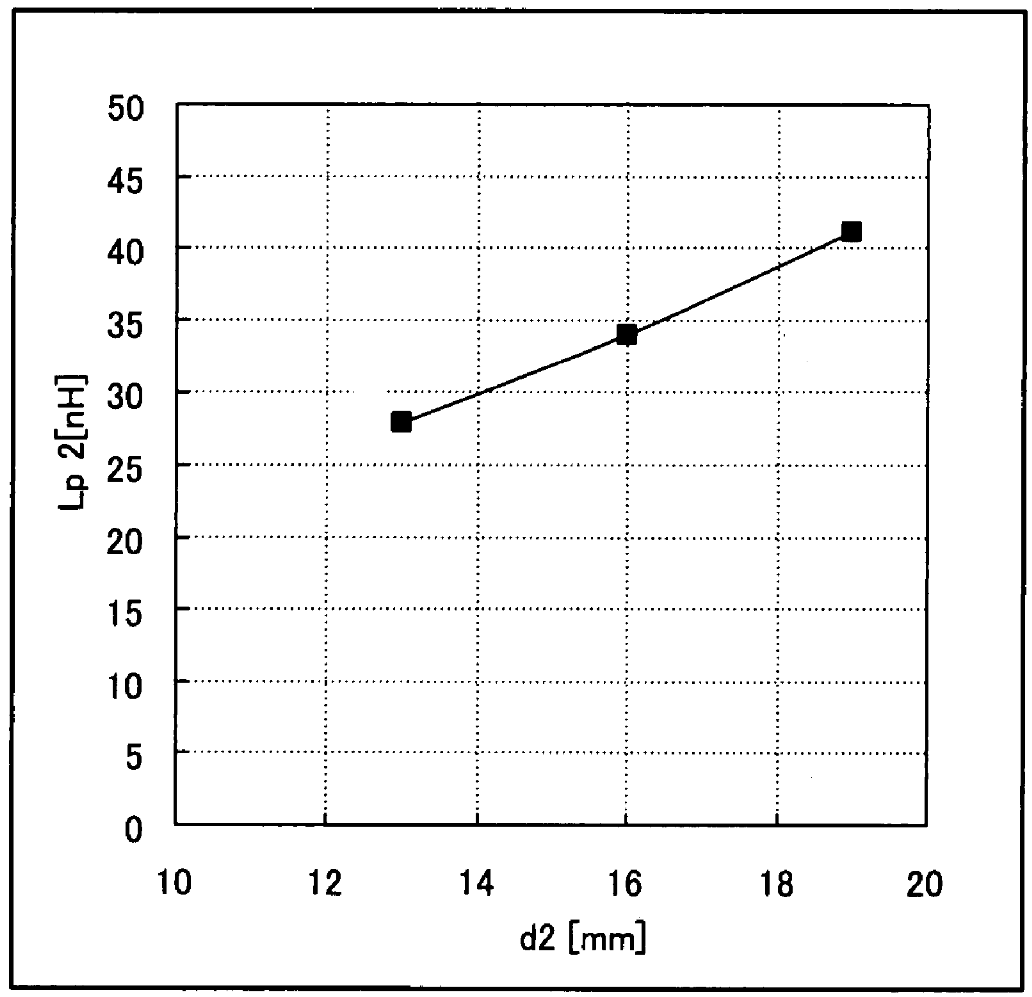
FIG. 9 is a diagram illustrating a result of an electromagnetic field simulation, which shows the relationship between the length of an inductor and the value of inductance.

FIG. 9 is a diagram illustrating a result of the electromagnetic field simulation, which shows the relationship between the length of an inductor and the value of inductance.

By changing the length d2 of the inductor 34 appearing in FIG. 7 within a range of 13 to 19 mm, for example, it is possible to adjust the inductance value Lp2 within a range of approximately 28 to 42 nH.

Figure 10:
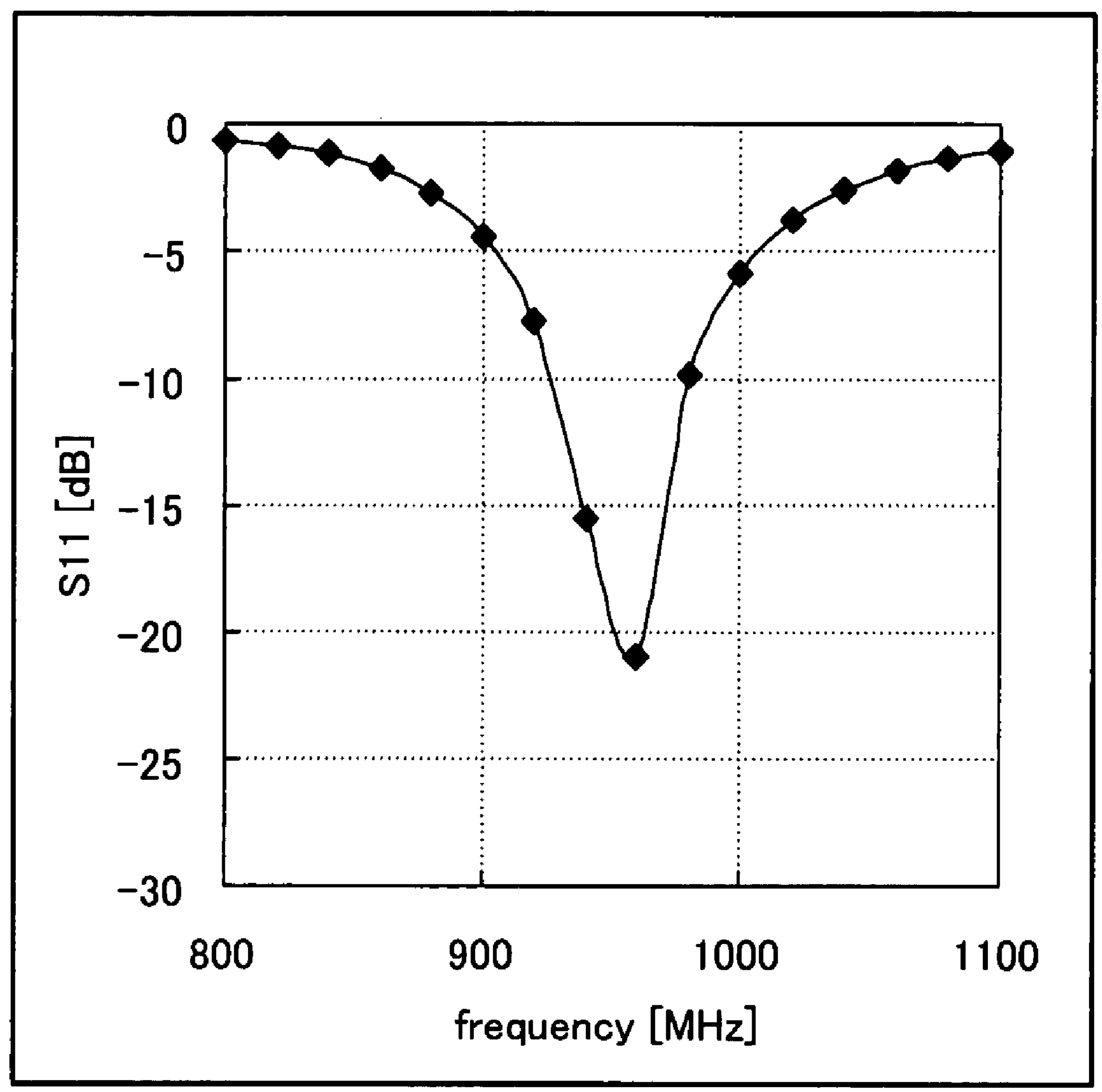
FIG. 10 is a diagram showing calculated values of a reflection coefficient between an antenna and an IC chip. The abscissa represents frequency.

For example, assuming that the resistance is 1000 Ω and the capacitance is 0.9 pF in the equivalent circuit of the IC chip 22 (see FIG. 14), it is required to set the radiation resistance Rr2 of the antenna 30 to 1000 Ω and the inductance value Lp2 to 31 nH so as to achieve impedance matching. Therefore, as can be understood from FIGS. 8 and 9, by selecting the line width w2 of the outermost peripheral line 31 as approximately 2 mm, and the length d2 of the inductor 34 as approximately 14.5 mm, the impedance matching between the IC chip 22 and the antenna 30 is achieved, whereby power received by the antenna 30 is sufficiently supplied to the IC chip 22. The reflection coefficient between the antenna and the IC chip at this time is as follows:

FIG. 10 is a diagram showing calculated values of the reflection coefficient between the antenna and the IC chip. The abscissa represents frequency.

Similarly to the case of the antenna 10 according to the first embodiment, when frequency f=953 MHz holds, the reflection coefficient S11 is below −20 dB, which shows that the impedance matching is sufficiently achieved.

Figure 11:
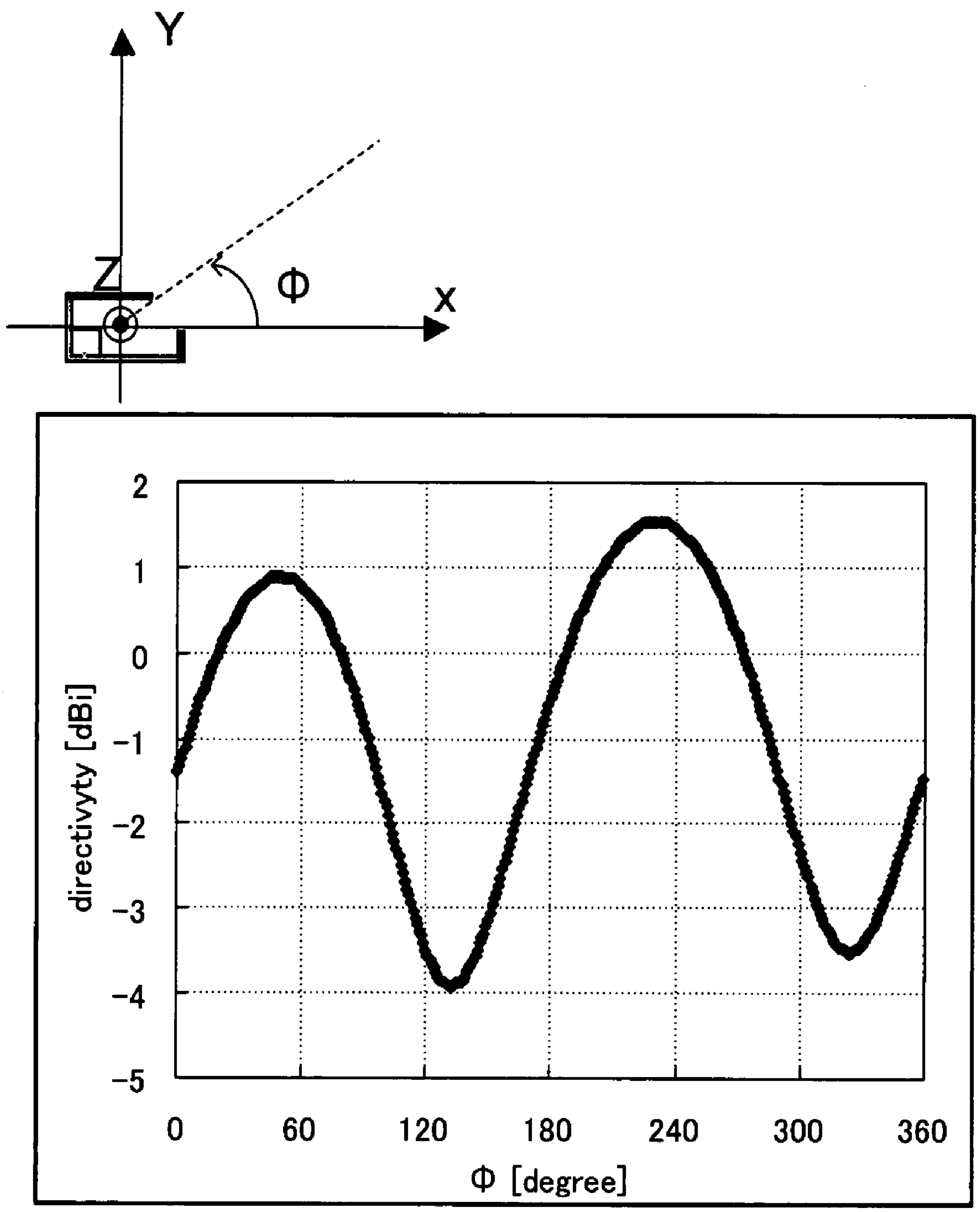
FIG. 11 is a diagram showing a radiation pattern of the antenna according to the second embodiment.

FIG. 11 is a diagram showing the radiation pattern of the antenna according to the second embodiment.

The abscissa represents an angle ϕ on an X-Y plane defined by an X axis representing a direction along a long side of the rectangle of the antenna 30 and a Y axis representing a direction along a short size of the same, as measured from the X axis which is set to 0 degrees, and the ordinate represents directivity.

While the directivity of the antenna 10, shown in FIG. 1, according to the first embodiment is maximized, as shown in FIG. 6, at the angle ϕ of 90° or 270°, the directivity of the antenna 30 according to the second embodiment, in which the outermost peripheral line 31 and the feeder line 33 are formed in a manner extending bilaterally asymmetrically with respect to the feeder part 32, is maximized, as shown in FIG. 11, at the angle ϕ of 45° or 225°, by adjusting the position of the feeder part 32.

For example, in a case where the RFID tag 20 is used in a fixed state, when it is desired to adjust its directivity, the antenna 30 according to the second embodiment is useful.

Although in the above-described first and second embodiments, the description is given of the antennas 10 and 30 which can be received within the card size (86 mm×54 mm), it is possible to further reduce the antenna size.

Figure 12:
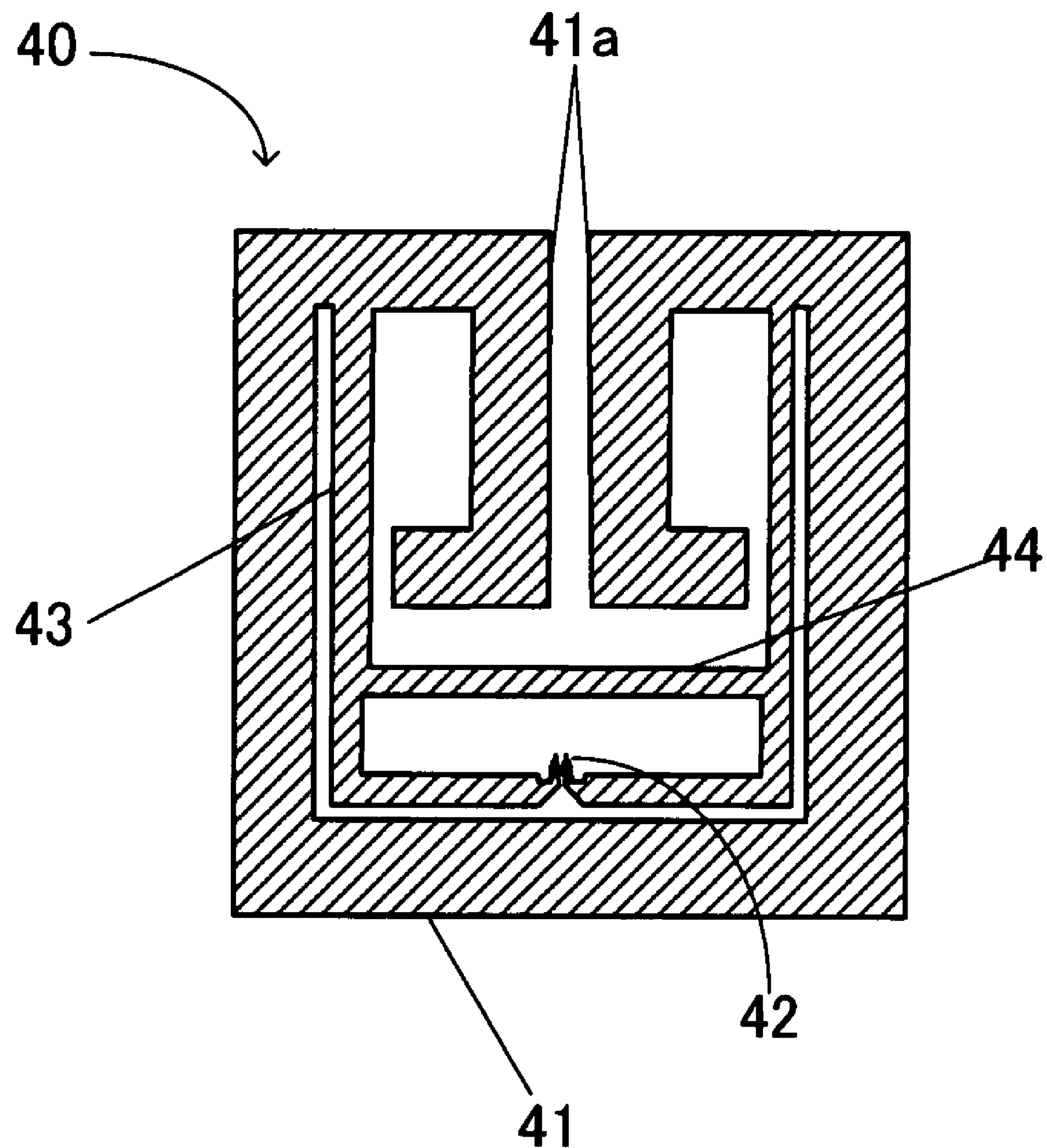
FIG. 12 is a view of the arrangement of an RFID antenna according to a third embodiment.

FIG. 12 is a view of the arrangement of an RFID antenna according to a third embodiment.

The antenna 40 according to the third embodiment comprises an outermost peripheral line 41 that is bent in a manner extending along the sides of a rectangle having a size of approximately 42 mm×42 mm, for example, and a feeder line 43 that is disposed close to the inner periphery of the outermost peripheral line 41 in a manner extending parallel therewith, and is electrically connected to the outermost peripheral line 41 at ends thereof, the feeder line 43 including a portion formed with a feeder part 42. If the size of the antenna is reduced as in the case of the antenna 40 according to the third embodiment, the outermost peripheral line 41 suffers from a length shortage by which the outer periphery of the rectangle having a size of 42 mm×42 mm, for example, is short of a length required for receiving radio waves of 953 MHz, and hence a length corresponding to the shortage is formed by bending the outermost peripheral line 41 into the inside of the rectangle, as illustrated by lines 41*a*.

Further, the antenna 40 has an impedance-adjusting inductor 44 for performing impedance matching with an IC chip (not shown) connected to the feeder part 42. The inductor 44 is disposed in an area inside the rectangle. In the antenna 40 according to the third embodiment, the inductor 44 is connected to two opposite sides of a rectangular shape into which the feeder line 43 is bent. Compared with the inductor 14 of the antenna 10 according to the first embodiment, the inductor 44 has no bent portion so as to eliminate loss due to current concentration.

It should be noted that the loss due to current concentration in the bent portion can also be reduced by forming the bent portions of the antennas 10, 30, and 40 according to the first to third embodiments in a curved manner.

Figure 13:
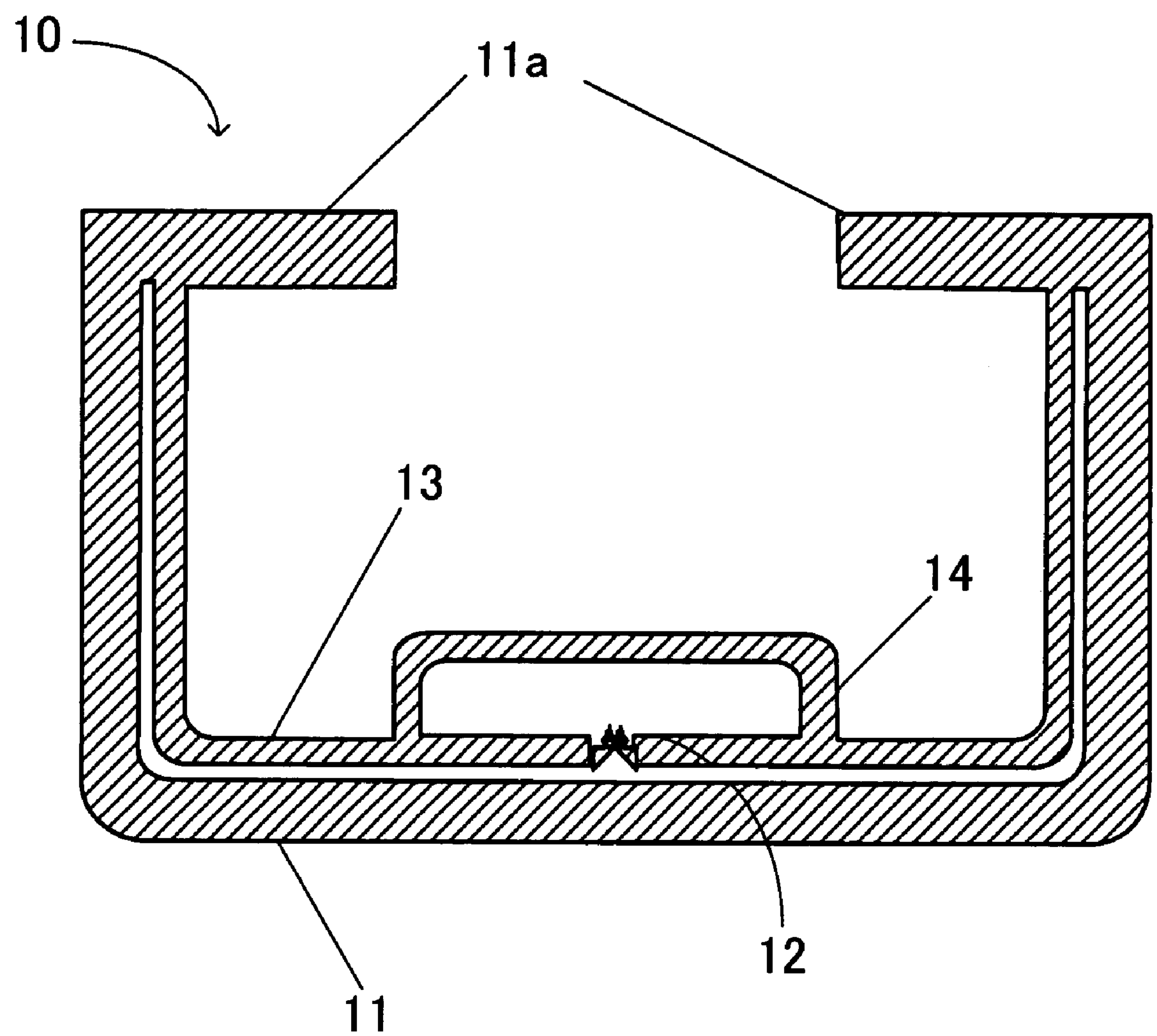
FIG. 13 is a view showing a case where some of bent portions of the antenna according to the first embodiment are formed in a curved manner.

FIG. 13 shows a case where some of the bent portions of the antenna according to the first embodiment are formed in a curved manner.

Further, as shown in FIG. 13, by forming the bent portions of the inductor 14 in a curved manner, the same advantageous effect can be obtained.

Although the above description has been given of the cases where radio waves in the UHF band, particularly radio waves of 953 MHz are used for communication, this is not limitative, but the present invention can also be applied to communication using other frequency bands.

The RFID antenna according to the present invention comprises the outermost peripheral conductive line that is bent in a manner extending along sides of a generally rectangular shape having a predetermined size, and the power-feeding conductive line disposed close to an inner periphery of the outermost peripheral conductive line in a manner extending parallel therewith, and is electrically connected to the outermost peripheral conductive line at ends thereof, the outermost peripheral conductive line including a portion formed with the feeder part. Therefore, the RFID antenna according to the present invention fits into the generally rectangular shape having a predetermined size, such as a card size, and therefore it is possible to install the RFID antenna in a space-saving manner.

Further, by installing the antenna constructed as above in an RFID tag, it is possible to reduce the size of the RFID tag.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An antenna for RFID, comprising:

an outermost peripheral conductive line that is bent in a manner extending along sides of a generally rectangular shape having a predetermined size; and a power-feeding conductive line that is disposed close to an inner periphery of said outermost peripheral conductive line in a manner extending parallel therewith, and is electrically connected to said outermost peripheral conductive line at ends thereof, said power-feeding conductive line including a portion formed with a feeder part, wherein a ratio between a line width of the power-feeding conductive line and a line width of the outermost peripheral conductive line is adjusted, such that radiation resistance is adjusted as desired.

2. The antenna according to claim 1, wherein said outermost peripheral conductive line is formed to have a sufficient length for receiving radio waves in a UHF band.

3. The antenna according to claim 1, wherein an impedance-adjusting inductor for performing impedance matching with an IC chip connected to said feeder part is disposed in an area inside the generally rectangular shape.

4. The antenna according to claim 3, wherein a bent portion of said inductor is bent in a curved manner.

5. The antenna according to claim 3, wherein said inductor is linearly connected to two opposite sides of a generally rectangular shape into which said power-feeding conductive line is bent.

6. The antenna according to claim 1, wherein said outermost peripheral conductive line and said power-feeding conductive line are formed asymmetrically with respect to said feeder part.

7. The antenna according to claim 1, wherein a portion of said outermost peripheral conductive line is formed by being bent into an inside of the generally rectangular shape, said portion having a length by which an outer periphery of the generally rectangular shape thereof is short of a length required for receiving electromagnetic waves of a predetermined frequency.

8. The antenna according to claim 1, wherein said outermost peripheral conductive line or said power-feeding conductive line has bent portions thereof bent at an angle of 90 degrees.

9. The antenna according to claim 1, wherein said outermost peripheral conductive line or said power-feeding conductive line has bent portions thereof bent in a curved manner.

10. An antenna for RFID, comprising:

an outermost peripheral conductive line that is bent in a manner extending along sides of a generally rectangular shape having a predetermined size;

a power-feeding conductive line that is disposed close to an inner periphery of said outermost peripheral conductive line in a manner extending parallel therewith, and is electrically connected to said outermost peripheral conductive line at ends thereof, said power-feeding conductive line including a portion formed with a feeder part; and an impedance-adjusting inductor for performing impedance matching with an IC chip connected to said feeder part, wherein the impedance-adjusting inductor is disposed in an area inside the generally rectangular shape surrounded by the outermost peripheral conductive line; wherein the power-feeding conductive line is bent in a manner extending along the inner peripheral of the outermost peripheral conductive line.

11. A non-contact tag for RFID, comprising:

an antenna including an outermost peripheral conductive line that is bent in a manner extending along sides of a generally rectangular shape having a predetermined size, and a power-feeding conductive line that is disposed close to an inner periphery of said outermost peripheral conductive line in a manner extending parallel therewith, and is electrically connected to said outermost peripheral conductive line at ends thereof, said power-feeding conductive line including a portion formed with a feeder part, wherein a ratio between a line width of the power-feeding conductive line and a line width of the outermost peripheral conductive line is adjusted, such that radiation resistance is adjusted as desired; and an IC chip connected to said feeder part.

12. The antenna according to claim 10, wherein the impedance-adjusting inductor is disposed in the area surrounded by the power-feeding conductive line.

* * * * *